US008775180B1

(12) United States Patent
Pettay et al.

(10) Patent No.: US 8,775,180 B1
(45) Date of Patent: *Jul. 8, 2014

(54) SCRIPT COMPLIANCE AND QUALITY ASSURANCE BASED ON SPEECH RECOGNITION AND DURATION OF INTERACTION

(71) Applicant: West Corporation, Omaha, NE (US)

(72) Inventors: Mark J. Pettay, Omaha, NE (US); Fonda J. Narke, Papillion, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/684,719

(22) Filed: Nov. 26, 2012

Related U.S. Application Data

(63) Continuation of application No. 13/334,390, filed on Dec. 22, 2011, which is a continuation of application No. 12/686,842, filed on Jan. 13, 2010, now Pat. No. 8,108,213, which is a continuation of application No. 10/668,678, filed on Sep. 23, 2003, now Pat. No. 7,664,641, which is a continuation-in-part of application No. 09/785,048, filed on Feb. 15, 2001, now Pat. No. 7,191,133.

(51) Int. Cl.
*G10L 15/00* (2013.01)

(52) U.S. Cl.
USPC ........... 704/246; 704/247; 704/251; 704/252; 704/271; 704/276

(58) Field of Classification Search
USPC .............................. 704/246, 251, 270.1–276
See application file for complete search history.

(56) References Cited

U.S. PATENT DOCUMENTS

| | | | |
|---|---|---|---|
| 3,752,904 A | 8/1973 | Waterbury | |
| 4,752,676 A | 6/1988 | Leonard et al. | |
| 4,860,360 A | 8/1989 | Boggs | |
| 4,993,068 A | 2/1991 | Piosenka et al. | |
| 5,153,918 A | 10/1992 | Tual | |
| 5,287,429 A | 2/1994 | Watanabe | |
| 5,412,727 A | 5/1995 | Drexler et al. | |
| 5,414,755 A | 5/1995 | Bahler et al. | |
| 5,434,949 A | 7/1995 | Jeong | |
| 5,504,805 A | 4/1996 | Dooyong | |
| 5,513,250 A | 4/1996 | McAllister | |
| 5,535,261 A | 7/1996 | Brown et al. | |
| 5,537,470 A * | 7/1996 | Lee ........................ | 379/265.11 |
| 6,170,011 B1 * | 1/2001 | Macleod Beck et al. ..... | 709/224 |
| 6,567,787 B1 * | 5/2003 | Walker et al. .................... | 705/16 |
| 6,965,868 B1 * | 11/2005 | Bednarek ...................... | 705/7.14 |
| 7,106,850 B2 * | 9/2006 | Campbell et al. ........ | 379/265.09 |
| 2003/0154072 A1 | 8/2003 | Young et al. | |

* cited by examiner

Primary Examiner — Leonard Saint Cyr

(57) ABSTRACT

Apparatus and methods are provided for using automatic speech recognition to analyze a voice interaction and verify compliance of an agent reading a script to a client during the voice interaction. In one aspect of the invention, a communications system includes a user interface, a communications network, and a call center having an automatic speech recognition component. In other aspects of the invention, a script compliance method includes the steps of conducting a voice interaction between an agent and a client and evaluating the voice interaction with an automatic speech recognition component adapted to analyze the voice interaction and determine whether the agent has adequately followed the script. In yet still further aspects of the invention, the duration of a given interaction can be analyzed, either apart from or in combination with the script compliance analysis above, to seek to identify instances of agent non-compliance, of fraud, or of quality-analysis issues.

20 Claims, 6 Drawing Sheets

SCRIPT COMPLIANCE AND QUALITY ASSURANCE BASED ON SPEECH RECOGNITION AND DURATION OF INTERACTION

CROSS-REFERENCE TO RELATED APPLICATIONS

This application is a continuation of U.S. patent application Ser. No. 13/334,390, filed on 22 Dec. 2011, which in turn is a continuation of U.S. patent application Ser. No. 12/686,842, filed on 13 Jan. 2010, now issued U.S. Pat. No. 8,108,213, which in turn is a continuation of U.S. patent application Ser. No. 10,668/678, filed on 23 Sep. 2003, now issued U.S. Pat. No. 7,664,641, entitled "SCRIPT COMPLIANCE AND QUALITY ASSURANCE BASED ON SPEECH RECOGNITION AND DURATION OF INTERACTION", which in turn is a continuation-in-part of U.S. patent application Ser. No. 09/785,048, filed on 15 Feb. 2001, now issued U.S. Pat. No. 7,191,133, entitled "SCRIPT COMPLIANCE USING SPEECH RECOGNITION". The benefit of the filing date of such application is hereby claimed to the fullest extent permitted under 35 U.S.C. §120, and the text of such application is incorporated herein by this reference as if set forth herein verbatim.

DETAILED DESCRIPTION OF THE PREFERRED EMBODIMENTS

Overview of the Invention

Figure 1:
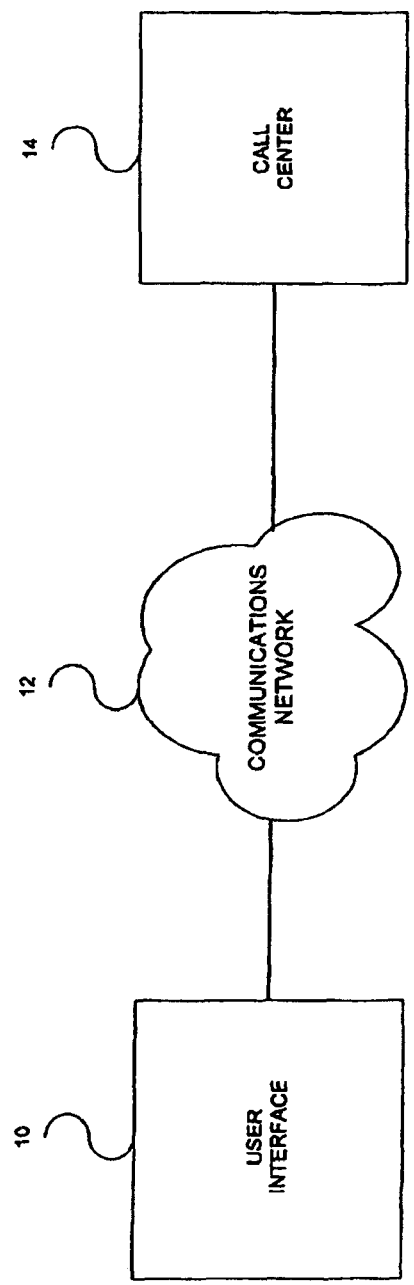
FIG. 1 is a block diagram demonstrating aspects of a communications system.

Apparatus and methods are provided for using automatic speech recognition technology to analyze a voice interaction and verify compliance of an agent reading a script to a client during the voice interaction. The apparatus and methods are particularly suited for use in any situation where a voice interaction takes place in which at least one participant is obliged to follow a prepared script, and are particularly suited for use in the operation of a call center, such as, for example, to evaluate or verify that call center agents are properly reciting scripts during telephone or web-based calls to or from call center customers.

In one aspect, a communications system includes a voice communications network providing voice connectivity between a system user and a call center. The call center preferably includes a call control device for receiving and routing calls, one or more agent workstations at which an agent is able to process an incoming or outgoing call, and a script compliance module for analyzing a voice interaction between the system user and the agent. The system user is able to access the communications system with any type of voice communications device, including, for example, a telephone, a voice-capable computer, or a wireless communications device. The voice communications network is provided with any form of voice communications capability needed to support the user's voice communications device, such as a digital communications network, standard telephone network, internet-based, or wireless network. The call control device provides the functions of receiving the voice communication from the communications network and routing the call to the agent workstation. The agent workstation will typically include a telephone and a computer, with the computer being optionally networked to a database for data access by the agent.

The script compliance module is provided with an automatic speech recognition (ASR) component, such as that provided by a speaker-independent, continuous speech, multilingual, multi-dialect ASR component such as those known in the art. The ASR component is adapted to receive a digital signal representing a voice interaction between the system user and the agent, and to provide an output of an analysis of the digital signal for use in a quality assurance (QA) process.

In another aspect, a method is provided for analyzing a voice interaction and verifying compliance of an agent reading a script to a client during the voice interaction, for example, as part of a telemarketing campaign. The voice interaction preferably takes place between a system user and an agent over the communications network, but may alternatively be a face-to-face voice interaction or any voice interaction capable of being captured and analyzed by an ASR component. The agent may be physically located within the call center, or may be at a distant location, but the voice interaction is preferably routed through the call control device at the call center. In the preferred embodiment, the agent is responsible for referring to and following a prepared script for at least a portion of the voice interaction. The voice interaction is captured, converted to digital form, and exposed to the ASR component, in real-time or in a recorded form, and the ASR component analyzes at least a portion of the voice interaction. The analyzed portion is compared against a standard, preferably the expected content from the prepared script or script portion associated with the given portion of the voice interaction, and a determination is made concerning the extent to which the agent complied with the script during the voice interaction. For example, one or more portions of the voice interaction may be assigned a score to indicate a level of script compliance by the agent, as determined by the ASR component, and taking into account any limitations (e.g., confidence-level thresholds) in the ASR component's ability to evaluate the voice interaction.

In yet another aspect, one or more actions are taken based upon the above script compliance determination. In a preferred embodiment, these actions are taken as part of a quality assurance or employee incentive program. The actions include, for example, sending the voice interaction to a quality assurance monitor for review, assigning the agent for random voice interaction review, sending an e-mail or other flag to an oversight authority for review, sending a voice or text message to the agent, updating a file associated with the agent, updating an incentive program to reflect the compliance determination, or other such actions.

In yet another aspect, a scripting package and quality assurance process are constructed to provide panel-level review of a voice interaction during the quality assurance process. The scripting package preferably includes a plurality of call scripts used by the agent during the voice interaction, a log record layout including provision for each value logged during the voice interaction, and a plurality of ASR reference texts corresponding with the plurality of call scripts. The voice interaction is recorded and logged, including a timestamp and time displacement for each script panel occurring during the voice interaction. The quality assurance process includes a provision for retrieving and reviewing the recorded voice interaction by panel level. Accordingly, if a script compliance scoring system is used, the score may be retrieved and reviewed for each panel forming a part of the voice interaction without having to review the entire voice interaction.

Several advantages are obtained through use of the apparatus and methods so described. For example, the described apparatus and method provide a script compliance function having a wide range and scope of applications at a relatively minor expense when compared to non-automated management systems. By employing an ASR component to analyze and evaluate the voice interactions, a call center provider can decrease or avoid the need to have individual managers or other call reviewers perform those functions. This becomes particularly advantageous to call centers having several agents, perhaps dozens or hundreds, or where the agents are not physically located on the call center premises.

A further advantage obtained by the present apparatus and methods is the ability to provide useful information concerning agent script compliance to a quality assurance (QA) authority in a time-effective manner. For example, when the apparatus and methods are used in real-time, a report may be submitted automatically to a QA authority almost immediately after a given voice interaction is completed. Where the voice interaction is recorded and reviewed later, time delays may still be minimized. In addition, near instantaneous feedback may be given to an agent to attempt to minimize problems with script compliance.

A still further advantage of the described systems and methods is the provision of panel-level playback and review of a voice interaction in the quality assurance process. This provides more effective and efficient methods of quality assurance in, for example, a call center operation.

Other and further advantages are described below and still others will be apparent from a review of the descriptions contained herein.

The communications systems and script compliance methods may optionally include additional, or fewer, features and functionality than those described herein for the preferred embodiments while still obtaining the benefits described. The inventions described herein are not limited to the specific embodiments described, or to the specific equipment, features, or functionality described for the apparatus and methods of the examples contained herein. These examples are provided to illustrate, but not to limit the inventions described.

The preferred embodiments include several aspects generally directed to voice communications apparatus and methods, several of which are described below. The primary preferred embodiment is a script compliance apparatus and method particularly adapted for use in a call center, and most particularly in a telemarketing application. While this embodiment is described in detail herein, it will be understood by those skilled in the art that other and further aspects and applications are possible. For example, the systems and methods may be adapted for use in call centers for applications other than telemarketing, or for voice interactions not associated with call centers or telemarketing operations. The following description is not intended to limit the scope of the described inventions, which are instead set forth in the appended claims.

DETAILED DESCRIPTION

FIG. 1 shows a block diagram of one implementation of the apparatus and methods of these inventions. The diagram in FIG. 1 reflects aspects of a call center implementation, though it will be understood that the various structures and functionalities may be extended to other implementations, including face-to-face voice interactions, electronic commerce, telephone, web, or wireless-based based information services, and the like. The communications system shown in FIG. 1 includes a user interface 10, a communications network 12, and a call center 14, each described in further detail below.

The user interface 10 provides the function of allowing a system user, such as a telemarketing customer, to conduct a voice communication with a telemarketing services provider. The user interface 10 may be a standard function telephone, a video telephone, a wireless communication device, an internet-based communication device, or other instrument adapted to support voice communication. In the preferred embodiment, the user interface is a standard telephone.

The communications network 12 provides the function of transmitting a voice signal between the user interface and the call center. Accordingly, the communications network 12 may include an analog or digital telephone network, an internet-based network, a wireless network, or any voice communications supporting network. The communications network 12 supports voice communications between a system user using the user interface communication device and, in the preferred embodiment, the call center 14. In the preferred embodiment, the communications network is a standard telephone service network provided by a long distance and/or local service carrier such as AT&T, Sprint, MCI, or others.

The call center 14 serves as a call termination and servicing point, and may be provided having any number of features, functions, and structures. In the typical call center, a call control component is provided to automatically receive and route calls to one or more telemarketing agents working at agent workstations within the call center. An agent workstation may include only a telephone, but it is typically provided with a networked computer and terminal used to support the agent functions. For example, a central database containing customer information and information relating to goods, services, or other offerings being provided by the telemarketer is typically provided and is accessible by the computers and terminals located at the agent workstations. When a telemarketing call is being processed, information relating to that call (e.g., customer identification information, product offerings information, credit card information, etc.) are automatically sent by the central database to the agent terminal in a "screen pop." The agent then reads information from the computer terminal as the call is processed, and enters new information as it is obtained during the call.

Figure 2:
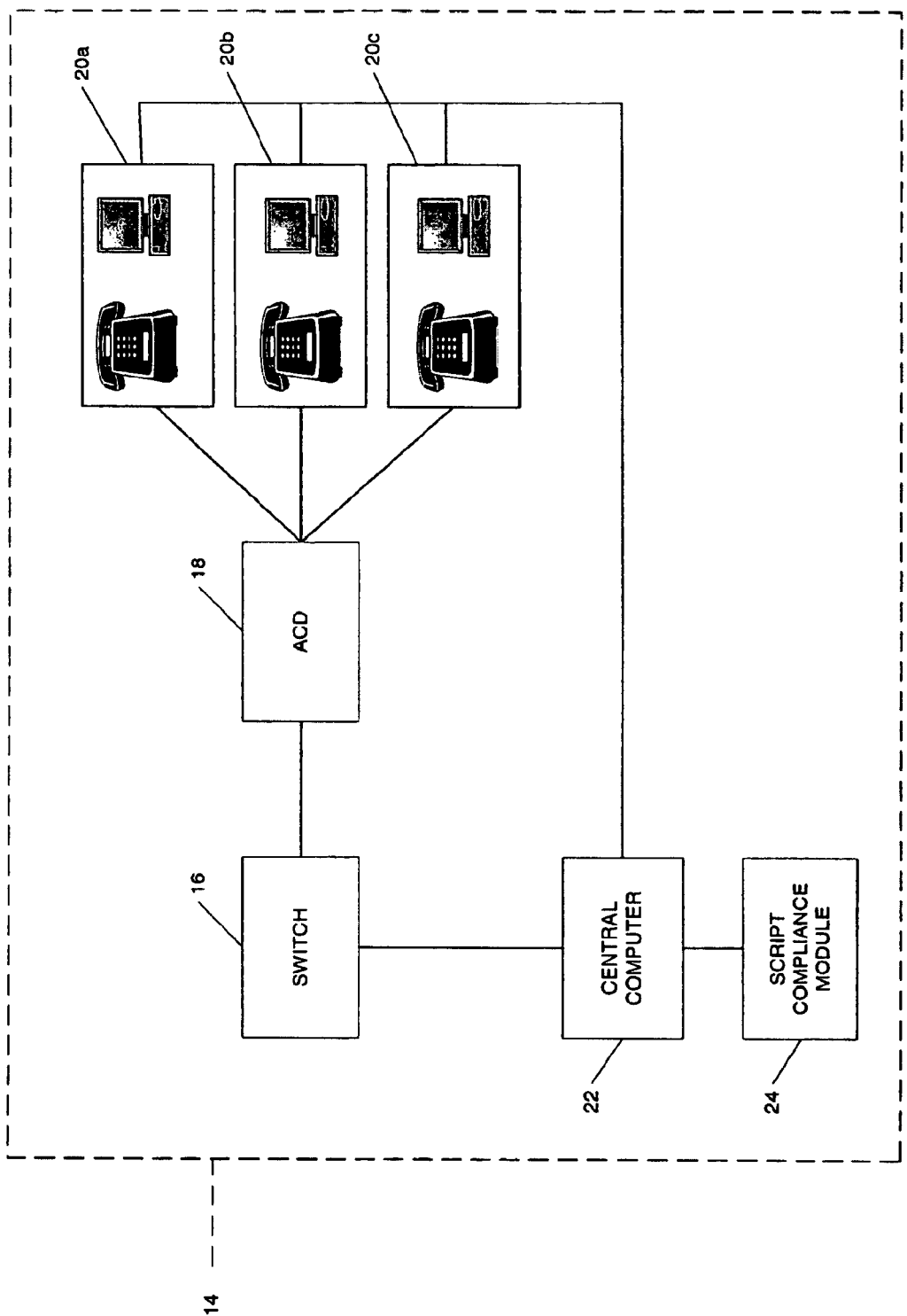
FIG. 2 is a block diagram showing a call center implementation of the described communications system.

FIG. 2 shows additional details of the call center 14 and, in particular, an embodiment representing an inbound call center. The call center 14 includes a programmable switch 16 that operates to receive incoming calls and to provide an interface for access to calls, call data, and other call center operations. The call center also preferably contains an automatic call distributor (ACD) 18 for routing calls to agents according to pre-determined criteria. While these primary functions of the switch and ACD are described, other details and functions of these devices are generally known in the art, and will not be discussed here.

Three agent workstations 20a-c are shown in the call center in FIG. 2. It is possible to have any number of agent workstations at the call center or, alternatively, to provide off-site agents that are able to access the call center remotely by another voice communications network not shown. In the case of an inbound telemarketing campaign using multiple agents, the switch and ACD cooperate to route calls to the appropriate location where an agent is able to process the calls. The agent workstation also includes a computer terminal at which data may be accessed by the agent. Typical call centers utilize computer-telephone integration (CTI) in which telephone number information (automatic number identification (ANI) or dialed number information service (DNIS)) is associated with other customer information stored on a database that is then accessed in real-time during a telemarketing call and a "screen pop" containing this information occurs at the agent workstation terminal. Additional information concerning the goods, services, or other offerings is also provided to the agent workstation terminal. A central computer 22 is shown in FIG. 2 having a network connection to each of the agent workstations, and a connection to the switch to obtain caller information from the incoming call. The details of the central computer and network are beyond the scope of the present inventions, and are therefore not discussed further here. Moreover, it is typical to provide a call center with other features and functions desired for a given call center application. Although these additional features and functions are not explicitly described herein, those skilled in the art will recognize that they may be added to the described system consistent with the needs of the given application.

In a particular preferred form, data is provided to the agent workstations during calls in a series of "panels", with each panel being associated with a particular script or portion of a script. The scripts are prepared as a part of a telemarketing campaign, and include the information needed to be given to the customer in a form intended to be effective and efficient to achieve its purpose. In particular, in a typical campaign, a telemarketer strives to obtain the most efficient result in the shortest transaction time in order to decrease on-line costs. The scripts are, therefore, typically highly-developed and tested to determine their effectiveness. A telemarketing campaign can be significantly undermined by an agent's failure to closely follow a script.

In addition, by presenting script information in panel form, a quality assurance process may preferably be coordinated with the scripting process to provide panel-level playback. This panel-level playback, as opposed to the need to play back and/or navigate through an entire telemarketing voice interaction to review a certain portion of it, is a significant advantage provided by the described system.

Accordingly, a script compliance module 24 is included in the call center. The script compliance module 24 is a software package that is shown in FIG. 2 as having an interface with the central computer, but its location within the call center is optional, as long as access is available to the digitized voice interaction. The script compliance module 24 performs several functions within the call center, as set forth in more detail below. The script compliance module includes an advanced speech recognition (ASR) component whereby a voice interaction between a customer and an agent may be analyzed and evaluated for compliance with an expected standard. As discussed below, the script compliance module may be constructed to operate in real-time, i.e., as the voice interaction takes place, or, preferably, it may include a recording capability such that voice interactions are reviewed and evaluated at a later time.

The ASR component of the script compliance module is supported by providing an appropriate ASR software package. These ASR software packages are commercially available, and examples include those available from Nuance Communications (Menlo Park, Calif.) and Speechworks International, Inc. (Boston, Mass.). A detailed description of speech recognition technology is not necessary to understand the systems and methods described herein. Briefly, however, the ASR component is adapted to capture a voice signal and convert it to digital form (if not presented to the ASR component in digital form already). The digital signal is then converted to a spectral representation that undergoes an analysis to match the spectral representation to a written vocabulary, and converts the voice signal to written text. Currently available systems are able to analyze continuous, multi-lingual, multi-dialect speech from in a speaker-independent manner and convert it to its corresponding text form.

As noted, the script compliance module 24 may be adapted to operate in real-time by including a component for converting the voice interaction to digital form for direct analysis by the ASR software package. In that case, the voice interactions are preferably captured live and fed directly to the digital converter and the ASR software package for analysis. Optionally, the script compliance module 24 may be adapted to analyze recorded voice interactions. In particular, and preferably, the script compliance module 24 or other system component may include one of the commercially available audio recording and monitoring systems such as those available from NICE Systems Ltd. or Witness Systems, Inc. In such a case, the voice interaction recorded by the audio recording and monitoring system may supply audio files to the ASR software package for analysis. Because recordings of the voice interactions may be useful to a call center administrator for other purposes, related or not to script compliance, the preferred embodiment includes a voice interaction recording component such as those described above.

Figure 3:
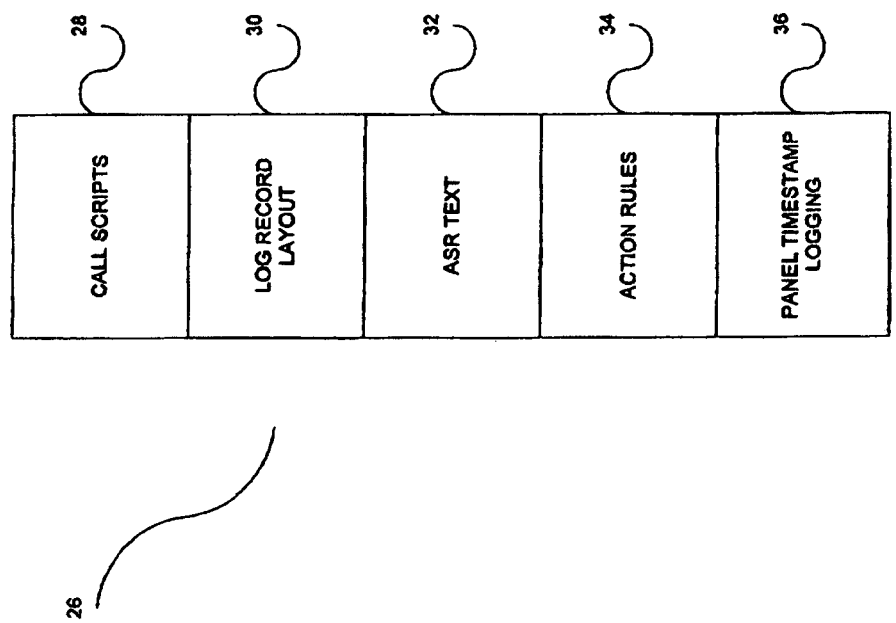
FIG. 3 is a block diagram of a scripting package for use in the described communications system and methods.

The script compliance module 24 preferably includes a scripting package 26, discussed in more detail below. The scripting package 26 is depicted graphically in FIG. 3, and includes the following components:

First, one or more call scripts 28 are provided. The call scripts 28 may be maintained in the script compliance module, or, preferably, they may be maintained on the central computer and accessible by the script compliance module. The call scripts 28 are accessed during the voice interaction and contain the information to be read by the agent to the customer during the voice interaction. As noted above, the call scripts 28 are preferably presented in separate panels containing discrete portions of the overall call script. As an agent progresses through a call, the agent moves from a first panel, to a second, to a third, and so on. A single offer of a good or service may be contained on a single panel, or on several panels. Alternatively, several offers may be presented during a single call.

Second, a log record layout module 30 is provided. A log record is preferably created for each voice interaction taking place at the call center. The log record layout includes data fields for all data that could be captured during calls, and log records are maintained as part of the ongoing function of the call center. The data fields will, of course, vary based upon the operation of the call center. Typical data fields will include date and time of call, length of call, agent identity, customer identity, and any transaction data obtained during the call. Some data fields may be filled automatically during a call, such as date, time, agent identity, and the like, while others may be filled by the agent during the call.

Third, an ASR text module 32 is provided. The ASR text is a reference text to be used by the ASR component of the script compliance module, and corresponds to the call scripts described above. As with the call scripts, the ASR text is preferably provided in separate panels.

Fourth, a set of action rules 34 is provided. In the most general sense, the action rules take the output of the ASR component evaluation of the voice interaction and, based thereon, direct an action to be taken by another component of the script compliance module. The output of the ASR component evaluation may comprise, for example, a numerical score indicating the degree to which the voice interaction complied with the ASR text. The actions directed by the set of action rules may comprise, for example, a quality assurance (QA) action to be taken based upon the numerical score. For example, scores less than 60 may be sent to a QA authority for review, scores between 60 and 80 may have random calls selected for review by a QA authority, and scores over 80 may be used to drive a QA incentive program. These are examples only. The determination of specific standards and actions will depend, of course, on the type of application.

Fifth, a panel timestamp logging feature 36 is provided. The panel timestamp logging feature assigns a time displacement timestamp to each panel as it is presented and viewed by an agent during a voice interaction with a customer. For example, in a voice interaction in which a first panel is processed in 15 seconds and a second panel is processed in 12 seconds, the first panel will log from 0:00:00 to 0:00:15 (i.e., the duration of the voice interaction relating to the first panel) and the next panel will log from 0:00:16 to 0:00:27. This progression continues for each panel used during the voice interaction. A log of the timestamps is maintained for each voice interaction. The timestamps are then preferably used in the quality assurance process to facilitate panel-level playback of the voice interaction.

Figure 4:
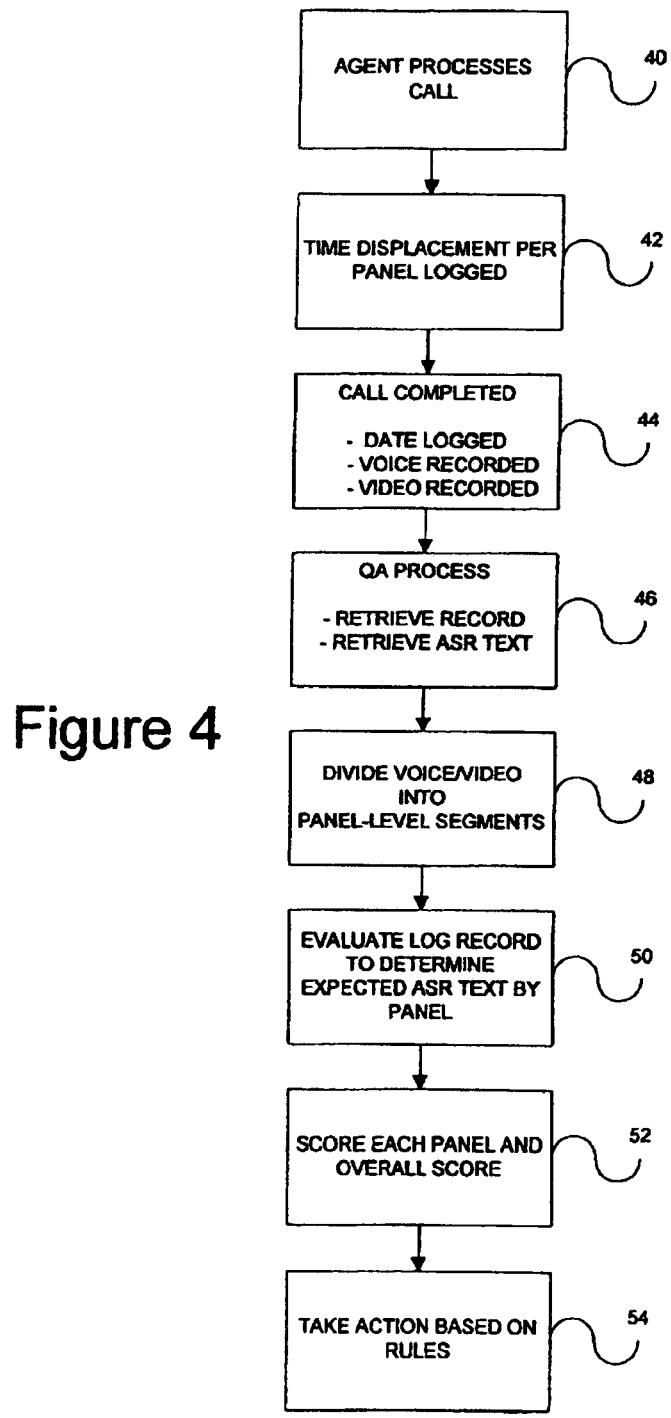
FIG. 4 is a block diagram of a quality assurance logging process and quality assurance method.

The communications system operation will now be described in reference to FIG. 4, and in the context of a telemarketing call. A telemarketing agent and a customer engage in a voice interaction during which the agent processes the call 40, i.e., the agent reads from scripts presented on the workstation terminal and enters information in the fields provided according to responses obtained from the customer. As noted above, the scripts are preferably presented to the agent in panels, with each panel corresponding to a portion of the overall script, or to a separate script. The time displacement per panel is logged 42 as a portion of the log record. Once the call is completed 44, all data obtained during the call is logged according to the log record layout. If a voice recording or video recording are made, they too are logged and stored for later use in the QA process.

The QA process 46 is next begun by retrieving the voice interaction record. The log record is also retrieved and reviewed to determine which scripts were to have been recited by the agent, and the corresponding ASR texts are retrieved for the ASR analysis. The voice and/or video recording is preferably divided into panel-level segments 48 for review and evaluation, and the log record is evaluated 50 to determine the expected ASR text by panel. A comparison of the voice interaction with the ASR text is then performed by the ASR component in order to determine the degree of compliance of the voice interaction with the ASR text. In the preferred embodiment, the ASR component assigns scores 52 based upon the level of accuracy of the comparison. Confidence-level thresholds are used in evaluating the match accuracy. After each panel is evaluated and scored, an overall score may be determined. The panel-level scores and overall scores are next used to determine any action 54 to be taken as provided in the pre-determined set of action rules. Examples of such actions include sending an e-mail containing the file for review, providing a feedback message to the agent, or other actions tailored to the particular application.

As an extension of the QA process, the stored voice interaction and log records may be retrieved from the system by a QA authority at a later time for additional analysis. The records may be used to review the assigned panel-level and/or overall compliance scores. In addition, all or a portion of the voice and/or video recording may be played back for analysis. The logging process included in the scripting package allows panel-level playback of the voice interaction either in conjunction with, or independent from the ASR analyzing function of the system.

Figure 5:
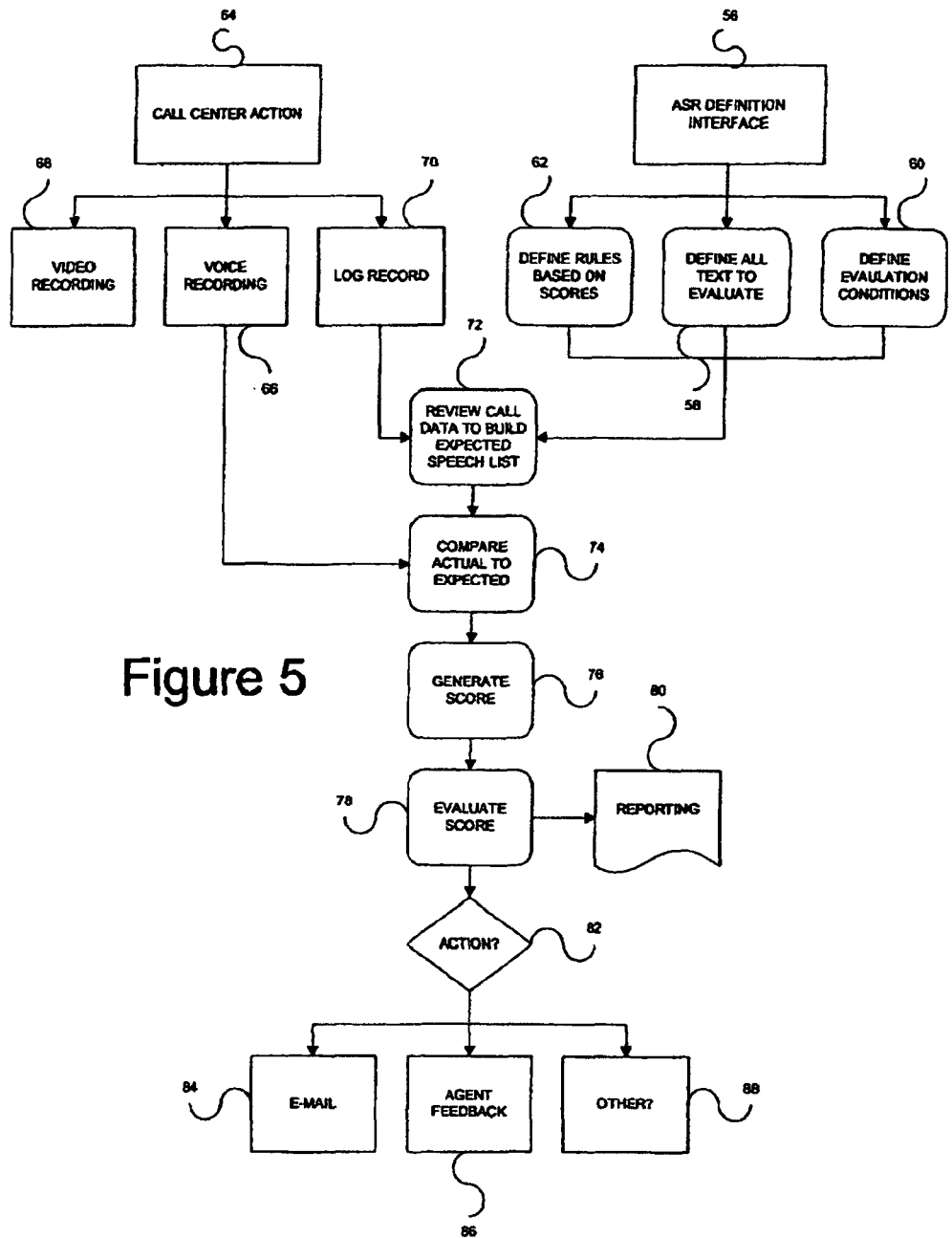
FIG. 5 is a block diagram showing a number of call center actions forming part of the communications system and methods.

A block diagram providing an additional representation of the call center actions is shown in FIG. 5. The ASR Interface 56 is used to set the initial conditions of the ASR component of the script compliance module. The initial conditions of the ASR component include the definitions of the ASR texts 58, the definitions of the evaluation conditions 60—i.e., the point in time during a voice interaction a given ASR text is expected to be read—and the action rules 62, discussed above. Any changes or modifications to the initial conditions are made by accessing these features via the ASR Interface 56 and making the desired changes.

When a call is processed 64, a voice recording is made 66 and, optionally, a video recording 68 is made. Each of these recordings may be separately logged and stored for later retrieval as needed. A log record 70 is created of the voice interaction during the call and is used, along with the ASR initial conditions, to build an expected speech list 72 to which the voice recording will be compared. For example, as a call is processed, the agent will view, read from, and enter information into several panels according to the nature and flow of the call. The interactive logic concerning all branching of the scripts and panels provided to the agent during the call is maintained on the central computer or, alternatively, in the script compliance module, and dictates which call scripts are presented to the agent at each step of the call. The evaluation conditions contain the information coordinating the voice interaction, scripts, panels, and ASR texts. These are used to build the expected speech list.

The actual voice recording is then compared 74 to the ASR text to determine compliance. A score is generated 76 indicating the measured compliance, taking into account the confidence-level thresholds of the ASR component, and the score is evaluated 78 against pre-determined standards. The pre-determined standards may be static or may vary, and may be included in the ASR evaluation conditions. For example, an 80% accuracy score may be sufficient for one script or script portion, but a 90% accuracy score may be required for another script or portion. The score and evaluation may be added to a report 80 of the call for later retrieval. An action 82 is next taken based upon the score according to the pre-determined set of action rules. Examples of these actions include e-mailing a report (which may optionally include a copy of the digital recording of the voice interaction) to a QA authority 84, providing a feedback message directly to the agent 86, or any other 88 action appropriate for the given application.

Figure 6:
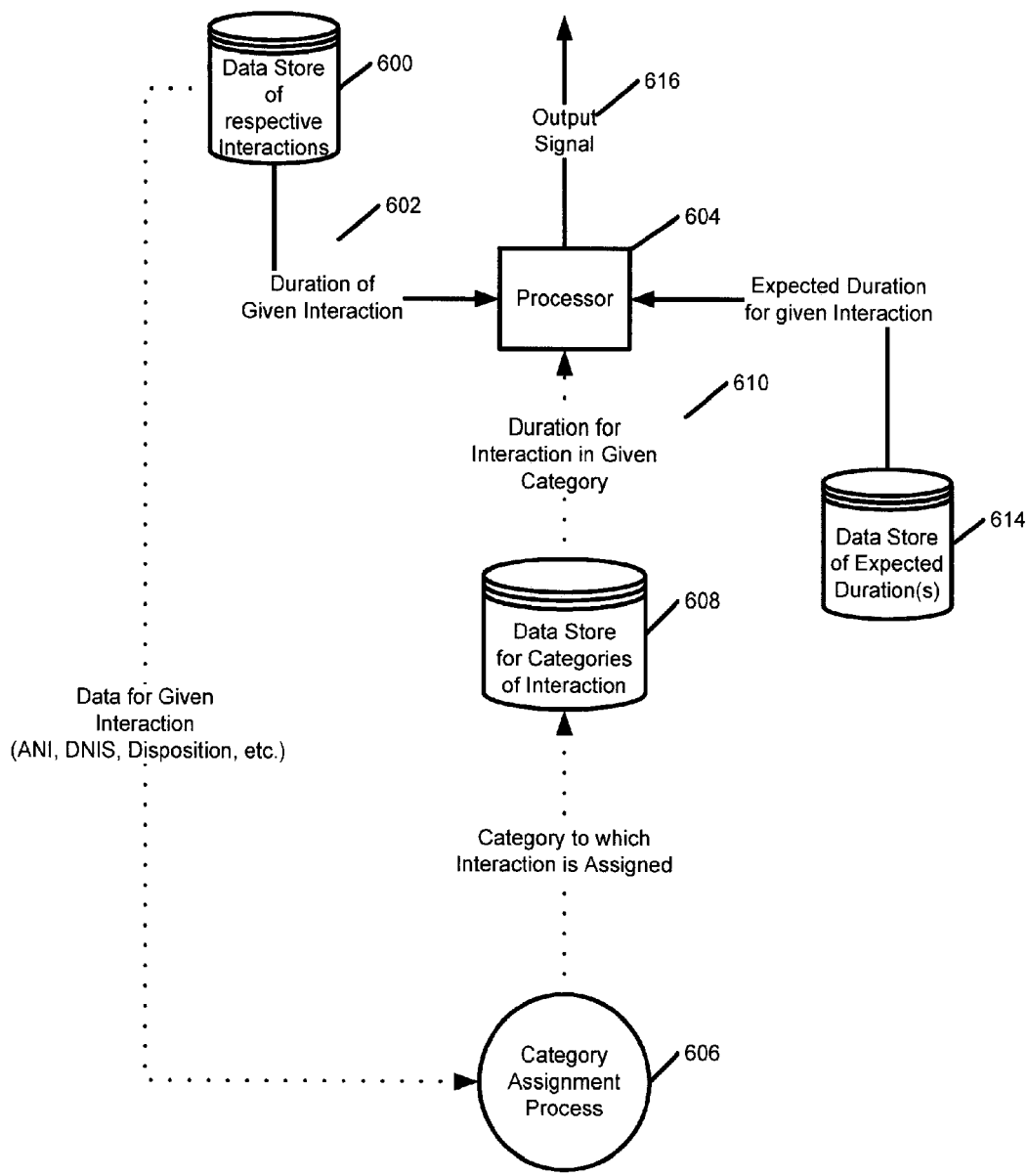
FIG. 6 is a data flow diagram illustrating processing performed by additional aspects of the invention that focus on the duration of the interaction.

FIG. 6 is a data flow diagram illustrating processing performed by additional aspects of the invention that focus on the duration of the interaction. These further aspects of the invention provide methods, and systems, processors 604, and computer-readable media suitable for performing the methods, of performing quality analysis on a plurality of interactions, with each one of the interactions involving at least one agent. The method can include at least the following. Data representing at least some of the plurality of interactions is obtained for example from a data store 600, with each one of the interactions having a respective duration. This duration can be expressed as a pre-processed and stored parameter, or can be derived by analyzing time-related data (timestamps or the like) associated with the data representing respective interactions. Data representing at least one expected duration parameter applicable to at least some of the interactions is obtained for example from a data store 614. For given ones of the interactions, the actual durations of the given interactions are compared to the expected duration parameters applicable to the interactions. Based on this comparison between the actual duration of given interactions and an expected duration of those given interactions, the given interactions are dispositioned.

Turning in more detail to the specific aspects of the method, obtaining data representing the plurality of interactions can include receiving respective voice records of the plurality of interactions. These voice records can be from the data store 600 records of voice-based interactions involving agents physically located at a call center or physically located remotely from a call center. In the former case, the call center might process incoming or outgoing telephone calls on behalf of a client of the call center, or the call center may be an in-house operation processing calls from its customers. In either case, the agents handling the interactions may be home-based or remote agents, who may contract with one or more call centers to handle such interactions on behalf of the call centers.

Given sufficient history and experience with processing such interactions, management entities (human or automated) responsible for preventing fraud and ensuring quality processing of such interactions can categorize interactions processed or expected to be processed by a call center or agents associated with such call center, and can associate a respective expected duration parameter with each category. A category assignment process 606 can receive as input parameters from, for example, the data store 600 that pertain to various interactions, such as DNIS, ANI, descriptions of goods/services involved therein, or any other data stored during conventional call center operations. Illustrative but non-limiting examples of categories, as may be stored in a data store 608, might include respective categories for at least one of inbound telemarketing calls, outbound telemarketing calls, customer service calls, and technical support calls, but other categories may become apparent to those skilled in the art in view of this teaching, and are within the scope of the instant invention. Once these categories are defined, the actual durations 602 of various given interactions can be retrieved and compared to expected duration parameters 610 that are associated with the category to which the given interactions are assigned.

Those skilled in the art will recognize that the dashed lines connecting blocks 600, 606, 608, and 604 indicate the optional status of the processing and data flow corresponding to those lines. Specifically, some embodiments of the invention may not include all or some of the above teaching regarding categorizing the various interactions. Where categories are not used, expected durations for various transactions can be stored and accessed from a data store 614.

Those skilled in the art will further recognize that for the purposes of convenience, legibility, and clarity, FIG. 6 illustrates the various data stores 600, 614, and 608 separately, and they are discussed separately herein. However, the embodiment shown in FIG. 6 is illustrative rather than limiting, and that some or all of these various data stores could readily be combined or consolidated into one or more data stores without departing from the scope of the invention.

Once the processor 604 compares the actual duration of a given interaction with the applicable expected duration parameter (whether defined on a per-interaction basis or a per-category basis), the given interaction may be dispositioned in response to an output signal 616, resulting from this comparison. Depending on the relationship between the actual duration and the expected duration parameters, apart from or combined with a consideration of any script compliance issues identified according to the teachings elsewhere herein, a comparison of the two might indicate a quality control (QC) issue or possibly a fraud issue with an agent who processed the interaction. Where such circumstances exist, the given interaction may be assigned for further evaluation, either by manual means such as live supervisors, and/or by automated means such as further processing by speech recognition systems.

As illustrative but non-limiting examples of the above teaching, if the actual duration of the interaction is less than a pre-defined standard applicable to the interaction or category of interactions, this circumstance may raise QC issues, and may suggest that the agent skipped part of a script controlling the interaction, or terminated the call prematurely and improperly. In such cases, the method can detect these types of occurrences and flag them appropriately for further investigation and/or follow-up with the agent in question. Conversely, if the actual duration of a given interaction or category of interactions exceeds a pre-defined standard applicable to the interaction, this circumstance may suggest that the agent failed to wrap-up and close the call in a timely manner or that the agent failed to pace the interaction appropriately. In other cases, interactions having excessive length may raise suspicions of fraud because the excessive length may have been due to the agent being distracted or occupied with performing improper activities during the interaction, such as copying down sensitive information belonging to a caller or call recipient, entering his/her own address as a ship-to address, or the like. In the context of home- or remotely-based agents, such agents are not subject to immediate, in-person supervision, so the need to proactively detect and investigate QC or fraud can be particularly acute with these agents, perhaps even more so than call center-based agents who are supervised in-person.

The pre-defined standards referenced herein can take various forms, such as a range of durations (e.g., X time-units through Y time-units) that are considered permissible or proper in the context of a given type or category of interaction. The pre-defined standards can also be specified in terms of a threshold value, such that an actual interaction having a duration above or below this threshold is either acceptable or unacceptable for example, an interaction having duration greater than A time-units or less than B time units may be defined as questionable on grounds of QC or fraud.

A suitable application program can implement software residing on the computer-readable medium or media readable and executable by the processor 604 and embodying the various aspects of the method discussed herein and shown in the drawing figures, and can be coded using any suitable programming or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like. Likewise, the invention as described herein is not dependent on any particular make or model of processor 604. Instead, any commercially available microprocessor or central processing unit (CPU) may be suitable, depending on the circumstances of a given application of the invention.

As those skilled in the art will understand, the program of instructions can be loaded and stored onto a program storage medium or device readable by the processor 604 or other machine, embodying a program of instructions executable by the processor 604 to perform the various aspects of the invention as discussed and claimed herein, and as illustrated in the drawing figures. Generally speaking, the program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

The foregoing cited references, patents and publications are hereby incorporated herein by reference, as if fully set forth herein. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A method, comprising:
    determining, by a processor, whether at least one agent has followed at least one script based on a threshold relating to an automatic speech recognition component's ability to analyze at least one voice interaction between the at least one agent and at least one client; and
    dispositioning at least one interaction, wherein the at least one agent reads the at least one script to the at least one client, based on a comparison of a duration of the at least one interaction to an expected duration parameter associated with the at least one interaction, wherein the dispositioning comprises indicating the at least one interaction as potentially fraudulent if the duration is outside of an expected duration.

2. The method of claim 1 comprising evaluating, by the processor, the at least one voice interaction with an automatic speech recognition component having the threshold.

3. The method of claim 2 comprising including supplying audio files of at least one voice interaction in real time and/or recording the at least one voice interaction and supplying the files to the automatic speech recognition component.

4. The method of claim 2, wherein evaluating the at least one interaction includes at least one of the following:
    converting the at least one voice interaction into at least one digital signal comprising at least one spectral representation of the at least one voice interaction;
    comparing the at least one digital signal to at least one reference standard that includes at least one known vocabulary; and
    matching the at least one digital signal to at least one of words and phrases contained in the at least one reference standard.

5. The method of claim 2, further comprising performing at least one action based upon at least one result of the evaluating of the at least one voice interaction, wherein performing at least one action includes at least one of:
    transmitting at least one signal to the at least one agent;
    transmitting at least one signal to at least one reviewing authority; and
    making at least one entry in at least one script compliance incentive system.

6. The method of claim 2, wherein evaluating the at least one voice interaction includes evaluating a plurality of panels.

7. The method of claim 6, further comprising assigning a respective score to each one of the panels.

8. The method of claim 1 wherein whether the at least one agent has followed the at least one script is based on a plurality of first scores related to respective portions of the at least one voice interaction.

9. The method of claim 8 wherein whether the at least one agent has followed the at least one script is based on a second score related to an overall compliance with the at least one voice interaction.

10. The method of claim 9, wherein at least one of the first scores and the second score are different for their respective portions of the at least one voice interaction.

11. The method of claim 1 comprising conducting the at least one voice interaction between the at least one agent and the at least one client, wherein conducting at least one voice interaction includes at least one of:
    conducting at least one voice interaction involving a telemarketing agent;
    conducting at least one voice interaction governed by at least one script that includes text corresponding to at least one offer of at least one of goods and services;
    conducting the at least one voice interaction at least in part on at least one communications network;
    conducting the at least one voice interaction at least in part on a publicly switched telephone network (PSTN);
    conducting the at least one voice interaction at least in part on at least one Internet;
    conducting the at least one voice interaction at least in part on at least one communications network having at least one wireless component;
    conducting at least one telephone call;
    conducting at least one telephone call that is initiated by the at least one client; and
    conducting at least one telephone call that is initiated by an entity other than the at least one client.

12. The method of claim 1, further comprising reviewing at least one determination of whether the at least one agent has followed the at least one script.

13. The method of claim 1, wherein determining whether the at least one agent has followed the at least one script includes defining at least one score assigned by the at least one automatic speech recognition component.

14. The method of claim 1, further comprising comparing data representing the duration of at least one interaction, wherein the at least one agent reads at least one script to the at least one client, to data representing an expected duration parameter associated with the at least one interaction.

15. The method of claim 1, wherein determining whether the at least one agent has followed the at least one script includes, at least in part, dispositioning at least one interaction, wherein the at least one agent reads at least one script to the at least one client, based at least in part on a comparison of data representing the duration of the at least one interaction to data representing an expected duration parameter associated with the at least one interaction.

16. A non-transitory computer-readable medium, comprising instructions for:
   determining, by a processor, whether at least one agent has followed at least one script based on a threshold relating to an automatic speech recognition component's ability to analyze at least one voice interaction between the at least one agent and at least one client; and
   dispositioning at least one interaction, wherein the at least one agent reads the at least one script to the at least one client, based on a comparison of a duration of the at least one interaction to an expected duration parameter associated with the at least one interaction, wherein the dispositioning comprises indicating the at least one interaction as potentially fraudulent if the duration is outside of an expected duration.

17. The non-transitory computer-readable medium of claim 16, comprising instructions for evaluating, by the processor, the at least one voice interaction with an automatic speech recognition component having the threshold.

18. The non-transitory computer-readable medium of claim 16, comprising instructions for supplying audio files of at least one voice interaction in real time and/or recording the at least one voice interaction and supplying the files to the automatic speech recognition component.

19. The non-transitory computer-readable medium of claim 16, wherein whether the at least one agent has followed the at least one script is based on a plurality of first scores related to respective portions of the at least one voice interaction.

20. The non-transitory computer-readable medium of claim 16, wherein whether the at least one agent has followed the at least one script is based on a second score related to an overall compliance with the at least one voice interaction.

* * * * *